United States Patent
Conklin et al.

(10) Patent No.: US 8,924,994 B2
(45) Date of Patent: Dec. 30, 2014

(54) POWER MANAGEMENT FOR AUDIENCE MEASUREMENT METERS

(75) Inventors: Charles Clinton Conklin, New Port Richey, FL (US); James J. Vitt, Palm Harbor, FL (US); Cheuk Wan Chan, Tarpon Springs, FL (US); Min Zhang, Lutz, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/149,500

(22) Filed: May 31, 2011

(65) Prior Publication Data

US 2012/0311620 A1 Dec. 6, 2012

(51) Int. Cl.
*H04N 7/16* (2011.01)
*H04H 60/32* (2008.01)

(52) U.S. Cl.
CPC .................................... *H04H 60/32* (2013.01)
USPC ................... 725/14; 725/12; 725/16; 725/25; 725/57; 725/95

(58) Field of Classification Search
USPC .............................. 725/14, 16, 25, 95, 12, 57
See application file for complete search history.

(56) References Cited

U.S. PATENT DOCUMENTS

| | | | |
|---|---|---|---|
| 2,855,993 A | 10/1958 | Rahmel | |
| 3,947,624 A | 3/1976 | Miyake | |
| 4,574,304 A | 3/1986 | Watanabe et al. | |
| 4,695,879 A | 9/1987 | Weinblatt | |
| 4,876,736 A | 10/1989 | Kiewit | |
| 4,912,552 A | 3/1990 | Allison, III et al. | |
| 4,930,011 A | 5/1990 | Kiewit | |
| 5,408,258 A | 4/1995 | Kolessar | |
| 5,894,331 A | 4/1999 | Yang | |
| 6,292,943 B1 | 9/2001 | Shin et al. | |
| 6,308,328 B1 | 10/2001 | Bowcutt et al. | |

(Continued)

FOREIGN PATENT DOCUMENTS

| | | |
|---|---|---|
| CA | 2777579 | 11/2012 |
| CN | 102981418 | 3/2013 |

(Continued)

OTHER PUBLICATIONS

Notice of Reasons for Rejection, issued by the Japanese Intellectual Property Office in connection with Japanese Patent Application No. P2012-118947, on Aug. 26, 2013, 4 pages.

(Continued)

*Primary Examiner* — Jivka Rabovianski
(74) *Attorney, Agent, or Firm* — Hanley, Flight & Zimmerman, LLC

(57) ABSTRACT

Power management methods, apparatus and articles of manufacture for audience measurement meters are disclosed. An example method disclosed herein comprises determining an activation state of a media presentation device, and controlling activation of an audience measurement meter based on the activation state of the media presentation device, the audience measurement meter to monitor the media presentation device when the activation state is an active state. Another example method disclosed herein comprises obtaining presentation device state data representing an activation state of a media presentation device to be monitored by an audience measurement meter, the presentation device state data including time information, and determining whether to fault audience measurement data reported by the audience measurement meter based on the presentation device state data and outage information determined from the audience measurement data.

21 Claims, 8 Drawing Sheets

(56) References Cited

U.S. PATENT DOCUMENTS

| | | | |
|---|---|---|---|
| 6,983,225 B2 | 1/2006 | Sprogis et al. | |
| 7,076,733 B2 | 7/2006 | Smith | |
| 7,115,317 B2 | 10/2006 | Zhuo et al. | |
| 7,411,631 B1 | 8/2008 | Joshi et al. | |
| 7,665,104 B2 | 2/2010 | Maehara et al. | |
| 7,739,718 B1* | 6/2010 | Young et al. | 725/127 |
| 7,786,987 B2 | 8/2010 | Nielsen | |
| 7,882,514 B2 | 2/2011 | Nielsen et al. | |
| 8,156,517 B2 | 4/2012 | Nielsen | |
| 2006/0184780 A1* | 8/2006 | Yamada et al. | 713/1 |
| 2006/0212895 A1 | 9/2006 | Johnson | |
| 2006/0225106 A1* | 10/2006 | Bedingfield, Sr. | 725/95 |
| 2007/0011040 A1* | 1/2007 | Wright et al. | 705/10 |
| 2009/0070797 A1 | 3/2009 | Ramaswamy et al. | |
| 2011/0126222 A1 | 5/2011 | Wright et al. | |
| 2012/0159529 A1 | 6/2012 | Nielsen | |

FOREIGN PATENT DOCUMENTS

| | | |
|---|---|---|
| JP | 63084396 | 4/1988 |
| JP | 2005020233 | 1/2005 |
| JP | 2006254297 | 9/2006 |
| JP | 2010171606 | 5/2010 |

OTHER PUBLICATIONS

Patent Examination Report No. 1, issued by Australian Intellectual Property Office in connection with Australian Patent Application No. 2012203037, on May 23, 2013, 4 pages.

Extended European Search Report, issued by European Intellectual Property Office in connection with European Patent Application No. 12004179.3, on Oct. 18, 2013, 7 pages.

The State Intellectual Property Office of China, "First Office Action", issued in connection with Chinese Patent Application No. 201210175375.2, dated May 12, 2014 (4 pages).

Canadian Intellectual Property Office, "Office Action", issued in connection with Canadian Patent Application No. 2,777,579, dated Mar. 10, 2014 (2 pages).

IP Australia, "Notice of Acceptance", issued in connection with Australian Patent Application No. 2012203037, dated Jul. 30, 2014 (2 pages).

IP Australia, "Examination Report", issued in connection with Australian Patent Application No. 2013203338, dated Sep. 30, 2014 (3 pages).

* cited by examiner

POWER MANAGEMENT FOR AUDIENCE MEASUREMENT METERS

FIELD OF THE DISCLOSURE

This disclosure relates generally to audience measurement and, more particularly, to power management for audience measurement meters.

BACKGROUND

Prior audience measurement systems include audience measurement meters that may operate continuously to ensure accurate monitoring of monitored media presentation devices, which may present media content at any time. As such, an audience measurement meter in one of these prior systems may consume power continuously, even when the associated media presentation device being monitored is inactive. Furthermore, in such a prior system, measurement data provided by the audience measurement meter may be faulted (e.g., considered invalid and/or discarded) for an entire monitoring period, such as an entire day, if the audience measurement meter experiences any loss of power and/or other outage for any duration during the monitoring period.

DETAILED DESCRIPTION

Figure 1:
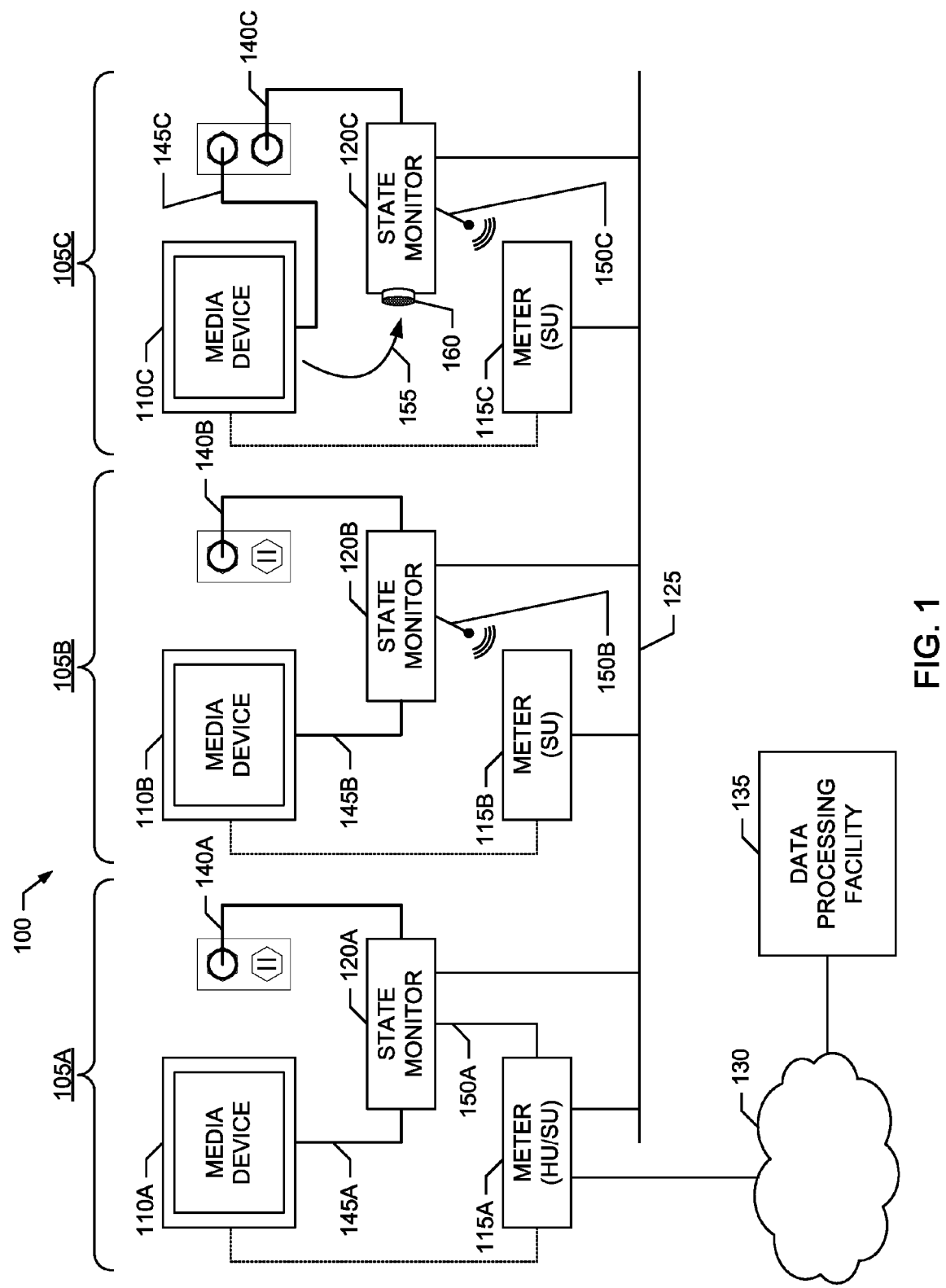
FIG. 1 is block diagram of an example audience measurement system employing power management for audience measurement meters as described herein.

Power management methods, apparatus and articles of manufacture for audience measurement meters are disclosed herein. An example power management method disclosed herein includes determining an activation state of a media presentation device, and controlling activation of an audience measurement meter, which is to monitor the media presentation device, based on the activation state of the media presentation device. In some examples, the activation state of the media presentation device is determined based on measuring power consumption of the media presentation device. In some examples, the activation state of the media presentation device is determined based on monitoring an audio output of the media presentation device. In some examples, controlling activation of the audience measurement meter includes sending a wake-up signal to the audience measurement meter in response to determining that the media presentation device is in an active state, and sending a sleep signal to the audience measurement meter in response to determining that the media presentation device is in an inactive state. In some examples, controlling activation of the audience measurement meter includes determining whether the media presentation device has been inactive over a time interval, and when the media presentation device has been inactive over the time interval, indicating that wake-up and interrogation of the audience measurement meter to obtain audience measurement data corresponding to the time interval can be skipped (e.g., to permit the audience measurement meter to remain in a sleep state).

Another example power management method disclosed herein includes obtaining presentation device state data representing an activation state of a media presentation device being monitored by an audience measurement meter. This example method also includes determining whether to fault audience measurement data reported by the audience measurement meter based on the presentation device state data and outage information determined from the audience measurement data. In some examples, determining whether to fault the audience measurement data includes determining that the audience measurement data is to be faulted when a first time interval over which the audience measurement data indicates an outage occurred overlaps a second time interval over which the presentation device state data indicates the media presentation device was in an active state, and determining that the audience measurement data is not to be faulted when the first time interval does not overlap the second interval. In some examples, the presentation device state data is determined by a state monitor that is separate from the audience measurement meter that determined the audience measurement data.

In at least some prior audience measurement systems, audience measurement meters operate continuously to ensure accurate monitoring of media content presented by monitored media presentation devices at any time. However, because media presentation devices are often inactive for substantial periods of time, such as overnight during normal sleeping hours, such continuous operation of these prior audience measurement meters can result in unnecessary and/or wasteful power consumption. In contrast to such prior systems, example power management methods, apparatus and articles of manufacture disclosed herein enable an audience measurement meter to be activated (e.g., woken-up) and deactivated (e.g., placed in sleep state) corresponding to a detected activation state of a media presentation device being monitored by the audience measurement meter, thereby improving energy efficiency of the audience measurement meter. Additionally or alternatively, example power management methods, apparatus and articles of manufacture disclosed herein can determine whether an audience measurement meter has audience measurement data to report and, thus, is to be woken up for interrogation, or whether the audience measurement meter does not have audience measurement data to report and, thus, can be permitted to continue operation in a low-power sleep state, which can also yield efficient energy consumption.

Furthermore, in at least some prior audience measurement systems, audience measurement data provided by an audience measurement meter may be faulted (e.g., invalidated, discarded, etc.) for an entire monitoring period, such as an entire day, if the audience measurement meter experiences any loss of power or other outage (e.g., such as a communication outage) for any duration during the monitoring period. In such prior systems, the audience measurement data is faulted under these circumstances because the data processing facility that is to process the audience measurement data cannot determine whether or not a media presenting device being monitored by the audience measurement meter may still have presented media content during the gap(s) in the measurement data resulting from the power loss experienced by the audience measurement meter. In contrast to such prior systems, example power management methods, apparatus and articles of manufacture disclosed herein enable a data processing facility to determine whether the media presenting device being monitored by the audience measurement meter was active or inactive during a power loss or other outage experienced by the audience measurement meter (e.g., where a power loss or other outage is indicated by a gap in the audience measurement data reported by the audience measurement meter). Moreover, if the media presenting device is determined to have been inactive while the audience measurement meter experienced the power loss or other outage, no media content could have been presented during the gap(s) in the measurement data resulting from the power loss or other outage and, thus, the data processing facility can determine that faulting the audience measurement data obtained from the audience measurement meter is unnecessary.

Turning to the figures, a block diagram of an example audience measurement system 100 employing power management for audience measurement meters as disclosed herein is illustrated in FIG. 1. The audience measurement system 100 of the illustrated example includes three example monitored sites 105A, 105B and 105C, which may reside at the same location (e.g., such as an audience members home) or at two or more different locations. The monitored site 105A includes an example media presentation device 110A and an example audience measurement meter 115A to monitor media content presented by the media presentation device 110A. Likewise, the monitored site 105B includes an example media presentation device 110B and an example audience measurement meter 115B to monitor media content presented by the media presentation device 110B, and the monitored site 105C includes an example media presentation device 110C and an example audience measurement meter 115C to monitor media content presented by the media presentation device 110C. To support power management for the audience measurement meters 115A-C in accordance with the examples described herein, the monitored sites 105A-C include respective example state monitors 120A-C, which are described in greater detail below. Although the audience measurement system 100 of the illustrated example includes three monitored sites 105A-C, audience measurement meter power management as described herein can be used in audience measurement systems 100 having any number of monitored sites 105A-C.

The example media presentation devices 110A-C can each correspond to any type of audio, video and/or multimedia presentation device capable of presenting media content audibly and/or visually. For example, one or more of the media presentation devices 110A-C can correspond to a respective television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As another example, one or more of the media presentation devices 110A-C can correspond to a multimedia computer system, a personal digital assistant, a cellular/mobile smartphone, a radio, etc.

The audience measurement meters 115A-C can each correspond to any type of metering device capable of monitoring media content presented by the respective media presentation devices 110A-C. In FIG. 1, the connections between the audience measurement meters 115A-C and the respective media presentation devices 110A-C are represented by dashed lines because the audience measurement meters 115A-C may support invasive monitoring involving one or more physical connections to the media presentation devices 110A-C, and/or non-invasive monitoring not involving any physical connection to the media presentation devices 110A-C. For example, one or more of the audience measurement meters 115A-C can process audio signals obtained from a microphone and/or a direct cable connection to detect content and/or source identifying audio codes and/or audio watermarks embedded in audio portion(s) of the media content presented by the respective one or more of the media presentation devices 110A-C. Additionally or alternatively, one or more of the audience measurement meters 115A-C can process video signals obtained from a camera and/or a direct cable connection to detect content and/or source identifying video codes and/or video watermarks embedded in video portion(s) of the media content presented by the respective one or more of the media presentation devices 110A-C. Additionally or alternatively, one or more of the audience measurement meters 115A-C can process the aforementioned audio signals and/or video signals to generate respective audio and/or video signatures from the media content presented by the respective one or more of the media presentation devices 110A-C, which can be compared to reference signatures to perform source and/or content identification. Other types of audience measurement meters 115A-C can also be supported by the example audience measurement meter power management techniques described herein.

In the audience measurement system 100 of FIG. 1, the media content monitoring functionality described above is referred to as site unit (SU) functionality to indicate that the scope of such functionality is limited to the particular monitored site 105A-C in which the respective audience measurement meter 115A-C resides. Additionally, the audience measurement meter 115A of the illustrated example implements home unit (HU) functionality. Home unit functionality involves data logging and forwarding functionality in which the home unit (e.g., the audience measurement meter 115A) interrogates the other site units (e.g., the audience measurement meters 115B-C) at a particular location (e.g., a subscriber household) to obtain the audience measurement data determined by each of the site units. Audience measurement data can include, for example, media content identification information, source identification information, content presentation duration information, audience member interaction information (e.g., such as channel and volume change information, digital video recorder command selections, etc.), audience member identification information, etc. The home unit then stores the audience measurement data obtained from the site units, and forwards this audience measurement data to a data processing facility for post-processing (e.g., to credit ratings for particular programs, verify commercial advertisement broadcasts, etc.).

For example, in the audience measurement system 100, the audience measurement meter 115A provides home unit functionality and, as such, interrogates the audience measurement meters 115B and 115C via an example network 125 to obtain audience measurement data from the monitored sites 105B and 105C, respectively. The audience measurement meter 115A then stores and reports this audience measurement data, as well as the audience measurement data determined by the audience measurement meter 115A itself for the monitored site 105A, via an example network 130 to an example data processing facility 135. The data processing facility 135 validates the reported audience measurement data, as described in greater detail below, and performs any appropriate post-processing of this data. In the illustrated example, the networks 125 and 130 can correspond to any type of wired or wireless data network, or combination thereof. Also, the networks 125 and 130 can correspond to portions of a common network, or can correspond to distinct networks.

As noted above, the audience measurement system 100 includes the state monitors 120A-C to support audience measurement meter power management as described herein. Generally, an example state monitor as described herein monitors an activation state of a respective media presentation device and controls activation of a respective audience measurement meter based on the monitored activation state of the respective media presentation device. For example, the state monitor can set its respective audience measurement meter to an enabled state (e.g., an active mode) when the respective media presentation device is determined to be active (e.g., on), and can set its respective audience measurement meter to a sleep state (e.g., a low power mode) when the respective media presentation device is determined to be inactive (e.g., off). Additionally or alternatively, the state monitor can indicate to a home unit that interrogation of its respective audience measurement meter can be skipped when the respective media presentation device is determined to have been inactive (e.g., off) during an interrogation interval (e.g., or other such measurement interval). Additionally or alternatively, the state monitor can determine and report presentation device state data representing the monitored activation state of its respective media presentation device, and which includes time information specifying an initiation time and duration for each monitored state, for use by a data processing facility when validating audience measurement data reported by the respective audience measurement meter.

For example, in the audience measurement system 100, the state monitor 120A is electrically coupled to a power source 140A. In the illustrated example, the state monitor 120A couples the power source 140A to the media presentation device 110A, which is represented by a line 145A. As such, the state monitor 120A can monitor the power consumption (e.g., by monitoring current consumption) associated with the power source 140A to determine the activation state (e.g., active/on or inactive/off) of the media presentation device 110A. Based on the monitored activation state of the media presentation device 110A, the state monitor 120A can control activation of the audience measurement meter 115A, for example, by causing the audience measurement meter 115A to enter an enabled state when the state monitor 120A determines that the media presentation device 110A is active, and by causing the audience measurement meter 115A to enter a sleep state when the state monitor 120A determines that the media presentation device 110A is inactive. In the example of FIG. 1, the state monitor 120A employs a physical (e.g., wired/cabled) connection 150A to control the audience measurement meter 115A in this manner. In the illustrated example, the state monitor 120A is also connected to the network 125 and, thus, can report presentation device state data representing the monitored activation state of the media presentation device 110A, and which includes time information specifying an initiation time and duration for each monitored state, to the home unit audience measurement meter 115A for subsequent reporting to the data processing facility 135. As described in greater detail below, the data processing facility 135 uses this reported presentation device state data, along with outage information determined from the audience measurement data reported by the meter 115A, to determine whether to fault or validate the audience measurement data reported by the meter 115A.

Similarly, the state monitor 120B is electrically coupled to a power source 140B. In the illustrated example, the state monitor 120B couples the power source 140B to the media presentation device 110B, which is represented by a line 145B. As such, like the state monitor 120A, the state monitor 120B can monitor the power consumption (e.g., by monitoring current consumption) associated with the power source 140B to determine the activation state (e.g., active/on or inactive/off) of the media presentation device 110B. Based on the monitored activation state of the media presentation device 110B, the state monitor 120B can control activation of the audience measurement meter 115B, for example, by causing the audience measurement meter 115B to enter an enabled state when the state monitor 120B determines that the media presentation device 110B is active, and by causing the audience measurement meter 115B to enter a sleep state when the state monitor 120B determines that the media presentation device 110B is inactive. However, unlike the wired connection 150A employed by the state monitor 120A, the state monitor 120B employs a wireless connection 150B to control the audience measurement meter 115B in this manner. Also, like the state monitor 120A, the state monitor 120B is connected to the network 125 and, thus, can report presentation device state data representing the monitored activation state of the media presentation device 110B, and which includes time information specifying an initiation time and duration for each monitored state, to the home unit audience measurement meter 115A for subsequent reporting to the data processing facility 135. As described in greater detail below, the data processing facility 135 uses this reported presentation device state data, along with outage information determined from the audience measurement data reported by the meter 115B, to determine whether to fault or validate the audience measurement data reported by the meter 115B. Additionally or alternatively, in some examples the state monitor 120B communicates with the home unit audience measurement meter 115A via the network 125 to indicate, based on the monitored activation state of the media presentation device 110B, whether interrogation of the audience measurement meter 115B to retrieve its audience measurement data can be skipped during a current interrogation interval (e.g., or other such measurement interval).

In the illustrated example of FIG. 1, the state monitor 120C is electrically coupled to a power source 140C for powering the state monitor 120C. However, unlike the arrangements of the state monitors 120A-B, the state monitor 120C of the illustrated example does not couple the power source 140C to the media presentation device 110C. Instead, the power source 145C for the media presentation device 110C may be separate from the power source 140C powering the state monitor 120C. As such, the state monitor 120C monitors one or more other operational aspects of the media presentation device 110C, such as by monitoring an audio signal 155 output from the media presentation device 110C using an example sensor 160, to determine the activation state (e.g., active/on or inactive/off) of the media presentation device 110C. Based on the monitored activation state of the media presentation device 110C, the state monitor 120C can control activation of the audience measurement meter 115C, for example, by causing the audience measurement meter 115C to enter an enabled state when the state monitor 120C determines that the media presentation device 110C is active, and by causing the audience measurement meter 115C to enter a sleep state when the state monitor 120C determines that the media presentation device 110C is inactive. The state monitor 120C, like the state monitor 120B, employs a wireless connection 150C to control the audience measurement meter 115C in this manner. Also, like the state monitors 120A-B, the state monitor 120C is connected to the network 125 and, thus, can report presentation device state data representing the monitored activation state of the media presentation device 110C, and which includes time information specifying an initiation time and duration for each monitored state, to the home unit audience measurement meter 115A for subsequent reporting to the data processing facility 135. As described in greater detail below, the data processing facility 135 uses this reported presentation device state data, along with outage information determined from the audience measurement data reported by the meter 115C, to determine whether to fault or validate the audience measurement data reported by the meter 115C. Additionally or alternatively, in some examples the state monitor 120C communicates with the home unit audience measurement meter 115A via the network 125 to indicate, based on the monitored activation state of the media presentation device 110C, whether interrogation of the audience measurement meter 115C to retrieve its audience measurement data can be skipped during a current interrogation interval (e.g., or other such measurement interval).

Figure 2:
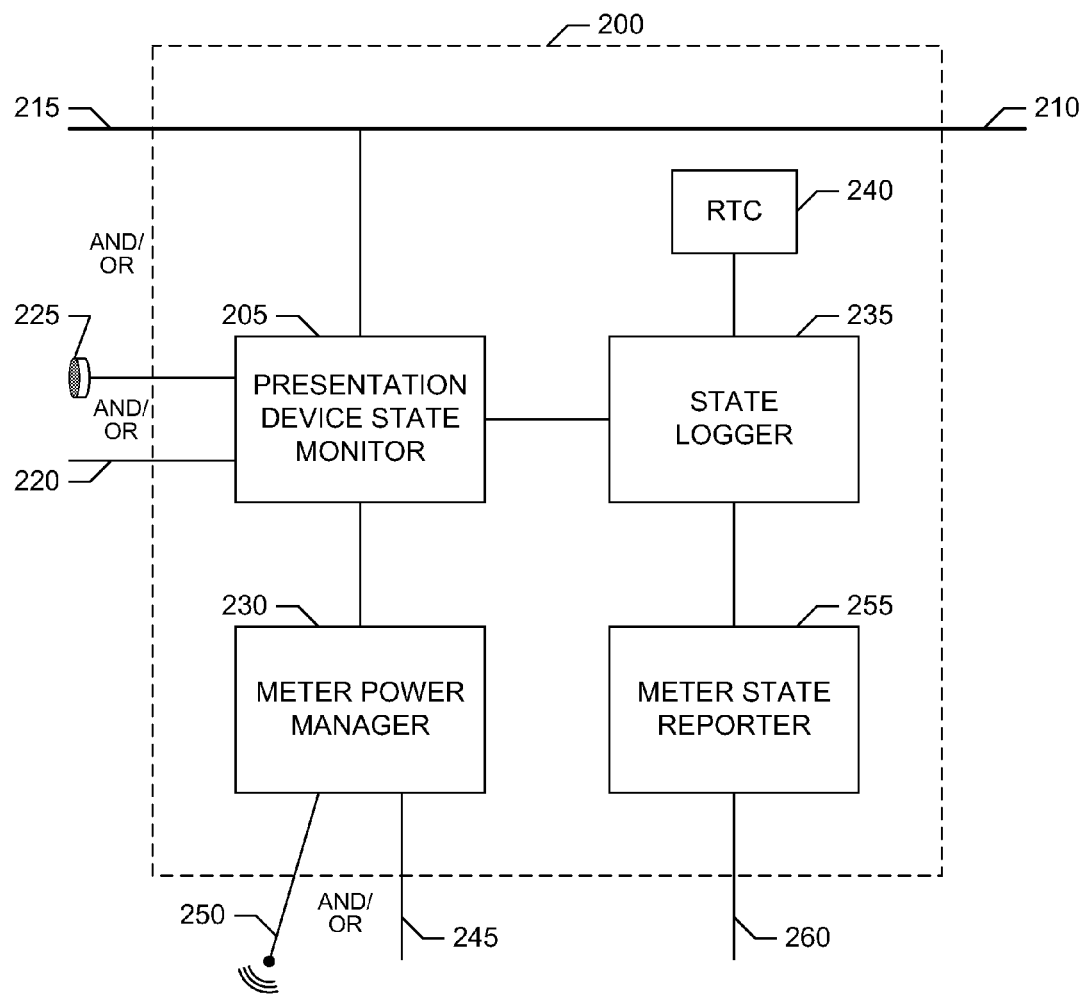
FIG. 2 is a block diagram of an example state monitor that may be used to implement the example audience measurement system of FIG. 1.

A block diagram of an example state monitor 200 that may be used to implement, for example, any of the state monitors 120A-C of FIG. 1 is illustrated in FIG. 2. The example state monitor 200 of FIG. 2 includes an example presentation device state monitor 205 to monitor an activation state of a media presentation device, such as one of the media presentation devices 110A-C. In the illustrated example, the state monitor 200 can be placed in-line with a power source (e.g., one of the power sources 140A-B) such that the power source is electrically coupled from a power input 210 to a power output 215. If the media presentation device is electrically coupled to the power output 215 to obtain power from the power source electrically coupled to the power input 210, the presentation device state monitor 210 can determine the activation state of the media presentation device by monitoring power consumption associated with power source electrically coupled to the power input 210.

For example, the presentation device state monitor 205 can be calibrated with a first power consumption threshold (e.g., such as a first current consumption threshold) corresponding to a minimum expected power (current) consumption when the monitored media presentation device is in an active/on state, and/or a second power consumption threshold (e.g., such as a second current consumption threshold) corresponding to a maximum expected power (current) consumption when the monitored media presentation device is in an inactive/off state. During operation, the presentation device state monitor 205 can use any appropriate technique to monitor the monitored power (current) consumption associated with power source electrically coupled to the power input 210, and then compare the monitored power (current) consumption with the first and/or second calibrated thresholds. In some examples, the presentation device state monitor 205 determines that the monitored media presentation device is in an active/on state if the monitored power (current) consumption is greater than the first threshold, and determines that the monitored media presentation device is in an inactive/off state if the monitored power (current) consumption is less than the second threshold. Alternatively, in some examples, the presentation device state monitor 205 determines that the monitored media presentation device is in the active/on state if the monitored power (current) consumption is greater than the first threshold, and determines that the monitored media presentation device is in the inactive/off state if the monitored power (current) consumption is less than the first threshold. Alternatively, in some examples, the presentation device state monitor 205 determines that the monitored media presentation device is in the active/on state if the monitored power (current) consumption is greater than the second threshold, and determines that the monitored media presentation device is in the inactive/off state if the monitored power (current) consumption is less than the second threshold.

Additionally or alternatively, the presentation device state monitor 205 can detect slope changes in measurements of power (current) consumption over time to determine when the monitored media presentation device has been switched from an inactive/off state to an active/on state. For example, if the presentation device state monitor 205 detects one or more positive slope changes corresponding to an increase in power (current) consumption over one or more respective (e.g., consecutive) measured time intervals, the presentation device state monitor 205 can determine that the monitored media presentation device has been switched from an inactive/off state to an active/on state. Conversely, if the presentation device state monitor 205 detects one or more negative slope changes corresponding to an decrease in power (current) consumption over one or more respective (e.g., consecutive) measured time intervals, the presentation device state monitor 205 can determine that the monitored media presentation device has been switched from an active/on state to an inactive/off state.

In some examples, the presentation device state monitor 205 can additionally or alternatively monitor a digital audio stream output by the monitored media presentation device and applied to a digital audio input 220 to determine the activation state of the monitored media presentation device. For example, for some media presentation devices, a digital audio stream is present whenever such a device is active/on, and the digital audio is absent whenever the device is inactive/off. For such media presentation devices, if the digital audio output of the monitored media presentation device is coupled to the digital audio input 220, the presentation device state monitor 205 can monitor the digital audio input 220 for the presence of a digital audio stream. If a digital audio stream is present, the presentation device state monitor 205 determines that the monitored media presentation device is in an active/on state. Otherwise, if the digital audio stream is absent, the presentation device state monitor 205 determines that the monitored media presentation device is in an inactive/off state.

In some examples, the presentation device state monitor 205 can additionally or alternatively monitor an audio signal emanating from the monitored media presentation device and received by an audio sensor 225, such as a microphone 225, to determine the activation state of the monitored media presentation device. For example, the presentation device state monitor 205 can monitor the output of the sensor 225 to detect the presence of an audio signal. If an audio signal is detected (e.g., based on a comparison with a signal energy threshold), the presentation device state monitor 205 determines that the monitored media presentation device is in an active/on state. Otherwise, if an audio signal is not detected, the presentation device state monitor 205 determines that the monitored media presentation device is in an inactive/off state. Additionally or alternatively, the presentation device state monitor 205 can use any one or more of the techniques described in U.S. Pat. No. 7,882,514, entitled "Display Device On/Off Detection Methods and Apparatus" and issued on Feb. 1, 2011, to process an audio signal output from the sensor 225 to determine an activation state of a monitored media presentation device. Additionally or alternatively, the presentation device state monitor 205 can employ any one or more of the techniques described in U.S. Pat. No. 7,882,514 to process output signals other than, or in addition to, an audio signal to determine an activation state of a monitored media presentation device.

The example state monitor 200 of FIG. 2 also includes an example meter power manager 230 to perform power management for an audience measurement meter (e.g., such as one of the audience measurement meters 115A-C) based on the current activation state of an associated media presentation device (e.g., such as one of the associated media presentation devices 110A-C) as determined by the presentation device state monitor 205. Table 1 illustrates an example set of operating states for an example audience measurement meter. Although the example set of operating states listed in Table 1 correspond to a meter implementation based on Intel's® Atom™ chipset, this list of operating states is representative of typical states in which other processors can be configured to operate. Furthermore, power management for audience measurement meters as described herein is not limited to being used with meters having the operating states listed in Table 1, but can be used with any meter having two or more operating states in which at least one state corresponds to an enabled (e.g., on) state, and at least one other operating state corresponds to a sleep or other lower power state.

TABLE 1

| State | Description |
|-------|-------------|
| S0 | Enabled state; system is on; central processing unit (CPU) is fully running |
| S1 | CPU is stopped; random access memory (RAM) is refreshed; system is running in a first low power mode |
| S2 | CPU is off (no power); RAM is refreshed; system is running in a second low power mode that is lower than the first low power mode |
| S3 | CPU is off (no power); RAM is in slow refresh state; power supply is in a reduced power mode, yielding a third low power mode lower than the first and second low power modes |

TABLE 1-continued

| State | Description |
|-------|-------------|
| S4 | Hardware is completely off, but system memory has been saved to disk |
| S5 | Hardware is completely off; operating system has shutdown; system memory is not saved to disk; system if off and a reboot is required to return to a working state |

Turning to Table 1, state S3 corresponds to a sleep (or low power) state into which a corresponding audience measurement meter (e.g., such as one of the audience measurement meters 115A-C) can be set in response to application of an appropriate sleep signal (or, equivalently, an appropriate sleep command). From state S3 or another low power state, the audience measurement meter can be woken or, in other words, configured to transition to state S0, which corresponds to an enabled (on) state, in response to application of an appropriate wake-up signal (or, equivalently, an appropriate wake-up command). Examples of appropriate wake-up signals/commands that can be used to wake-up the audience measurement meter from the sleep state (S3) include one or more of: (1) an RTC alarm signal that causes the audience measurement meter to transition to the enabled state (S0) upon occurrence of a configured real time clock (RTC) alarm; (2) a wake-on-LAN signal that causes the audience measurement meter to transition to the enabled state (S0) upon detection of data at a local area network (LAN) interface; (3) wake-on-WLAN signal that causes the audience measurement meter to transition to the enabled state (S0) upon detection of data at a wireless LAN (WLAN) interface; (4) a wake-on-USB signal that causes the audience measurement meter to transition to the enabled state (S0) upon detection of data at a universal serial bus (USB) interface; etc. Another example of a wake-up signal/command includes asserting a signal on an appropriately configured input/output (I/O) pin such that asserting the signal on the I/O pin causes an interrupt to occur, which transitions the meter from a sleep state to an enabled state. Yet another example of a wake-up signal/command includes sending a message over an appropriately configured bus which, when the message is detected, causes the meter to transition from a sleep state to an enabled state.

In some examples, the meter power manager 230 uses the current activation state of a monitored media presentation device as determined by the presentation device state monitor 205 to determine whether to send a sleep signal or an appropriate wake-up signal to an associated audience measurement meter. For example, assume without loss of generality that the example state monitor 200 of FIG. 2 is used to implement the state monitor 120A of FIG. 1. In such an example, further assume that the media presentation device 110A in inactive/off, and the audience measurement meter 115A is in the sleep state (S3). When the presentation device state monitor 205 detects that the media presentation device 110A has transitioned to an active/on state, the meter power manager 230 sends an appropriate wake-up signal to the audience measurement meter 115A to cause the meter 115A to transition to the enabled state (S0). For example, the meter power manager 230 can send a wake-on-LAN signal, send a wake-on-USB signal, send an appropriate bus message and/or assert an appropriate I/O pin via a physical (e.g., wired/cabled) power control connection 245. Additionally or alternatively, the meter power manager 230 can send a wake-on-WLAN signal via a wireless power control connection 250. Then, assume that sometime later the presentation device state monitor 205 detects that the media presentation device 110A has transitioned to an inactive/off state. In response, the meter power manager 230 sends an appropriate sleep signal to the audience measurement meter 115A via one or both of the connections 245 and/or 250 to cause the meter 115A to transition to the sleep state (S3).

The example state monitor 200 of FIG. 2 further includes an example state logger 235 to log presentation device state data representing the monitored activation state of the media presentation device as determined by the presentation device state monitor 205. For example, the presentation device state data can include information indicating occurrences of activation state changes and the resulting activation state (e.g., active/on, inactive/off, etc.) of the monitored media presentation device. Additionally, in the illustrated example, the state monitor 200 of FIG. 2 includes an example real time clock (RTC) 240, or similar clocking/timing mechanism, capable of tracking absolute or relative time. The state logger 235 uses the RTC 240 to track the initiation time of each monitored change in the activation state of the monitored media presentation device, and the duration for each resulting monitored activation state of the monitored media presentation device. In some examples, this timing information is included in the presentation device state data logged by the state logger 235. Furthermore, the state monitor 200 can include a battery and/or other backup power supply (not shown) to permit the presentation device state monitor 205 to continue monitoring the activation state of a particular media presentation device, and to permit the state logger 235 to continue logging the presentation device state data, during power outage events. The presentation device state data can be stored in any data format, such as one or more data structures, database entries, etc.

Additionally, the example state monitor 200 of FIG. 2 includes an example meter state reporter 255 to receive and reply to state queries received via an interface 260 from, for example, a home unit (e.g., such as the home unit audience measurement meter 115A). Referring to the audience measurement system 100 of FIG. 1, in some examples, the home unit audience measurement meter 115A queries the site unit audience measurement meters 115B and 115C at regular interrogation intervals to obtain their stored audience measurement data. If a particular site unit audience measurement meter 115B-C is in a sleep state (e.g., state S3) at the time of an interrogation query, the particular site unit audience measurement meter 115B-C will wake-up and transition to an enabled state (e.g., state S0) in response to being interrogated. However, if the respective media presentation device 110B being monitored by the particular site unit audience measurement meter 115B-C has been inactive/off during the entire interrogation/measurement interval associated with the interrogation query (e.g., due to a power outage, lack of device use, etc.), the particular site unit audience measurement meter 115B-C will have no audience measurement data to report. In such circumstances, causing the particular site unit audience measurement meter 115B-C to wake-up to respond to a received interrogation query is unnecessary and can result in reduced energy efficiency of the meter and/or reduce backup battery life (e.g., if the meter 115B-C is operating on backup battery power during a power outage and is in a sleep state to conserve power, but is then woken unnecessarily).

To avoid querying a particular site unit audience measurement meter 115B-C when it has no audience measurement data to report, the home unit audience measurement meter 115A can first send a state query to the state monitor 120B-C associated with the particular site unit audience measurement meter 115B-C to obtain information regarding the activation state of the respective media presentation device 110B-C during the interrogation/measurement interval. If the state monitor 120B-C replies with an indication that the respective media presentation device 110B-C has been inactive during the entire interrogation/measurement interval and, thus, audience measurement data is unavailable, the home unit audience measurement meter 115A can skip interrogation of the particular site unit audience measurement meter 115B-C during the current interrogation/measurement interval. If, however, the state monitor 120B-C replies with an indication that the respective media presentation device 110B-C has been active during at least part of the interrogation/measurement interval and, thus, audience measurement data may be available, the home unit audience measurement meter 115A can proceed with interrogating the particular site unit audience measurement meter 115B-C to obtain its audience measurement data for the current interrogation/measurement interval.

Returning to FIG. 2, the meter state reporter 255 can receive such state queries from a home unit and process the presentation device state data logged by the state logger 235 to determine whether a media presentation device being monitored by the state monitor 200 has been inactive or active during the current interrogation/measurement interval (e.g., since the last state query was received). If the presentation device state data indicates that the monitored media presentation device has been inactive during the current interrogation/measurement interval, the meter state reporter 255 can reply to the state query with an indication that no audience measurement data is available (and, thus, interrogation of the associated audience measurement meter can be skipped) because the media presentation device has been inactive. However, if the presentation device state data indicates that the monitored media presentation device has been active during at least part of the current interrogation/measurement interval, the meter state reporter 255 can reply to the state query with an indication that audience measurement data may be available (and, thus, interrogation of the associated audience measurement meter should be performed) because the media presentation device has been active.

In some examples, the meter state reporter 255 additionally or alternatively supports receiving and responding to queries for the presentation device state data logged by the state logger 235. For example, a home unit (e.g., such as the home unit audience measurement meter 115A) can query the state monitor 200 to obtain its presentation device state data for reporting to a data processing facility (e.g., such as the data processing facility 135). As described in greater detail below, the a data processing facility can then use this presentation device state data to determine whether to fault or validate audience measurement data being reported by an audience measurement meter associated with the state monitor 200.

Figure 3:
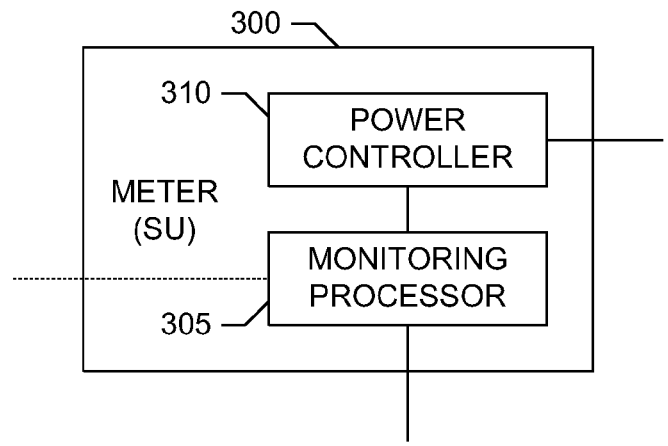
FIG. 3 is a block diagram of a first example audience measurement meter that may be used to implement the example audience measurement system of FIG. 1.

A block diagram of an example site unit audience measurement meter 300 that may be used to implement, for example, any of the site unit audience measurement meters 115B-C of FIG. 1 is illustrated in FIG. 3. The example site unit audience measurement meter 300 of FIG. 3 includes an example monitoring processor 305 to monitor media content presented by a media presentation device (e.g., such as one of the media presentation devices 110B-C) using any invasive or non-invasive monitoring technique, such as one or more of the monitoring techniques described above in connection with audience measurement system 100 of FIG. 1.

The example site unit audience measurement meter 300 of FIG. 3 also includes an example power controller 310 to control power consumption of the meter 300, including power consumption associated with the monitoring processor 305, in response to signals/commands received from a state monitor, such as one of the state monitors 120B-C or 200 described above. For example, assume that the monitoring processor 305 supports operating states such as those listed in Table 1. Then, in response to receiving a sleep signal/command from an associated state monitor, the power controller 310 of the site unit audience measurement meter 300 can configure the monitoring processor 305 to enter a sleep state, such as the state S3 of Table 1, or one of the other low power states. Furthermore, in response to receiving an activation (e.g., wake-up) signal/command (e.g., such as a wake-on-LAN signal, a wake-on-USB signal, a wake-on-WLAN signal, etc.) from the associated state monitor, the power controller 310 can configure the monitoring processor 305 to enter an enabled state, such as the state S0 of Table 1.

Figure 4:
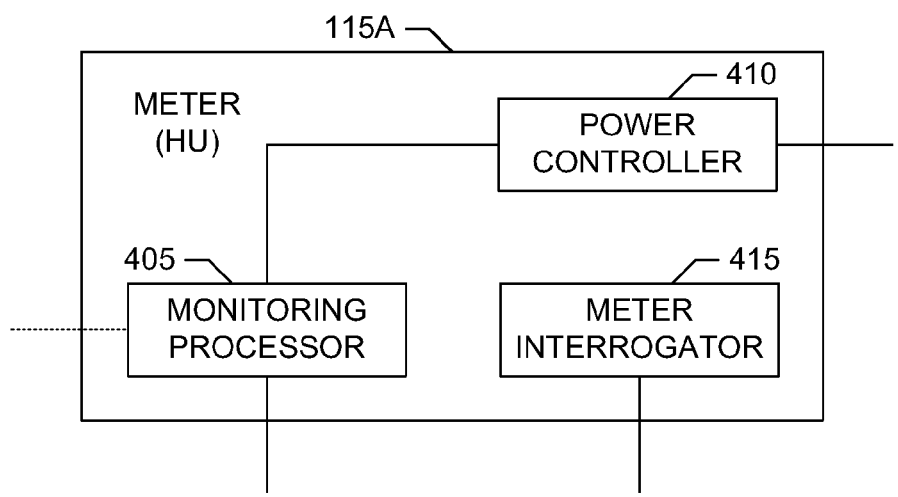
FIG. 4 is a block diagram of a second example audience measurement meter that may be used to implement the example audience measurement system of FIG. 1.

A block diagram of an example implementation of the home unit audience measurement meter 115A of FIG. 1 is illustrated in FIG. 4. The example home unit audience measurement meter 115A of FIG. 4 includes an example monitoring processor 405 and an example power controller 410, which may be similar or identical to the respective monitoring processor 305 and power controller 310 of FIG. 3. The home unit audience measurement meter 115A of FIG. 4 also includes an example meter interrogator 415 to interrogate site units, such as the site unit audience measurement meters 115B-C, to obtain their stored audience measurement data. Additionally or alternatively, in some examples, the meter interrogator 415 is configured to query a state monitor, such as one of the state monitors 120B-C or 200, associated with the site unit to obtain information regarding the media presentation device being monitored by the site unit before querying the site unit for its audience measurement data.

Assume, for example and without loss of generality, that a current interrogation/measurement interval has expired and the home unit audience measurement meter 115A is to interrogate the site unit audience measurement meter 115B. In some examples, prior to interrogating the meter 115B, the meter interrogator 415 of the home unit audience measurement meter 115A sends a state query to the state monitor 120B to obtain information regarding the activation state of the media presentation device 110B during the current interrogation/measurement interval. If the state monitor 120B replies with an indication that the media presentation device 110B has been inactive during the entire interrogation/measurement interval, the meter interrogator 415 can determine that no audience measurement data is available at the site unit audience measurement meter 115B and, thus, skip interrogating the meter 115B for current interrogation/measurement interval. As such, the meter interrogator 415 can avoid causing the site unit audience measurement meter 115B to wake-up and consume additional power unnecessarily. However, if the state monitor 120B replies with an indication that the media presentation device 110B has been active during at least part of the current interrogation/measurement interval, the meter interrogator 415 can determine that audience measurement data may be available at the site unit audience measurement meter 115B and, thus, interrogate the meter 115B to obtain its audience measurement data.

Figure 5:
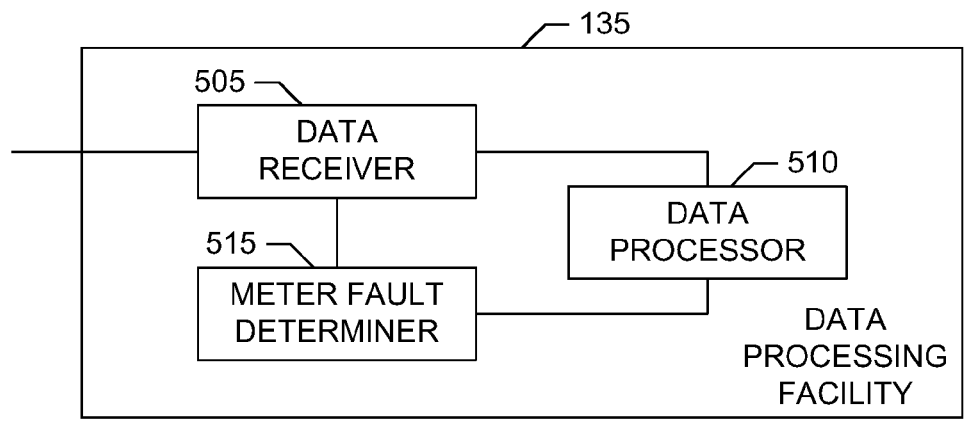
FIG. 5 is a block diagram of an example data processing facility that may be used to implement the example audience measurement system of FIG. 1.

A block diagram of an example implementation of the data processing facility 135 of FIG. 1 is illustrated in FIG. 5. The example data processing facility 135 of FIG. 5 includes an example data receiver 505 to receive audience measurement data from one or more home units, such as the home unit audience measurement meter 115A. Additionally, in some examples, the data receiver 505 receives presentation device state data representing the activation state(s) of media presentation device(s) associated with the received audience measurement data. In the illustrated example of FIG. 5, the data processing facility 135 also includes an example data processor 510 to perform any type of post-processing on the audience measurement data obtained by the data receiver 505. Examples of post-processing that can be performed by the data processor 510 includes, but is not limited to, determining ratings information for content presented at the monitored sites 105A-C, performing commercial advertisement verification for commercials included in the media content presented at the monitored sites 105A-C, etc.

Additionally, the example data processing facility 135 of FIG. 5 includes an example meter fault determiner 515 to determine whether to fault (e.g., invalidate) audience measurement data obtained by the data receiver 505 and corresponding to a particular audience measurement meter. Prior techniques for determining whether to fault audience measurement data generally fault the data for an entire measurement interval if the audience measurement data indicates that the audience measurement meter experienced a power outage or other outage (e.g., such as a communication outage) during any portion of the measurement interval. In contrast to such prior techniques, the fault determiner 515 can use the presentation device state data obtained by the data receiver 505 to determine whether audience measurement data that indicates that an outage has occurred is to be faulted or can remain valid even though the outage occurred.

For example, assume without loss of generality that the data receiver 505 receives audience measurement data associated with the audience measurement meter 115B, and which indicates that the meter 115B experienced outage(s) during one or more outage intervals (e.g., as indicated by gap(s) in the audience measurement data). Such outage(s) can correspond to power outage(s), communication outage(s) corresponding to a disruption in communication between the site unit audience measurement meter 115B and the home unit audience measurement meter 115A, other outage(s), or combination(s) thereof. The data receiver 505 also receives presentation device state data associated with the state monitor 120B that indicates occurrences of activation state changes and the resulting activation states (e.g., active/on, inactive/off, etc.) of the monitored media presentation device 110B, as well as the initiation time of each activation state change and the duration for each resulting monitored activation state. For example, in the case of a communication outage between the site unit audience measurement meter 115B and the home unit audience measurement meter 115A, the state monitor 120B may still be able to report its presentation device state data to the home unit audience measurement meter 115A via a different communication link/network. If the fault determiner 515 determines that any time interval over which the presentation device state data indicates the media presentation device 110B was in an active state overlaps with any outage interval indicated by the audience measurement data, the fault determiner 515 faults the audience measurement data because the meter 115B was unable to monitor the media presentation device 110B for at least some of the time when the latter was active. However, if the fault determiner 515 determines that no time interval(s) over which the presentation device state data indicates the media presentation device 110B was in an active state overlaps with any outage interval indicated by the audience measurement data, then the fault determiner 515 can decide to not fault the audience measurement data because no outage prevented the meter 115B from monitoring the media presentation device 110B while the latter was active. Furthermore, in some examples, if the fault determiner 515 detects that a particular audience measurement meter is experiencing outages over an extended period of time (or any appropriate interval of time), the fault determiner 515 can cause appropriate repair personnel to be dispatched to the affected monitored site to diagnose and repair the cause of the outage.

While example manners of implementing the audience measurement meters 115A-C and 300, the state monitors 120A-C and 200, and the data processing facility 135 have been illustrated in FIGS. 2-5, one or more of the elements, processes and/or devices illustrated in FIGS. 2-5 may be combined, divided, re-arranged, omitted, eliminated and/or implemented in any other way. Further, one or more of the example audience measurement meters 115A-C and/or 300, the example state monitors 120A-C and/or 200, the example data processing facility 135, the example presentation device state monitor 205, the example meter power manager 230, the example state logger 235, the example RTC 240, the example meter state reporter 255, the example monitoring processors 305 and/or 405, the example power controllers 310 and/or 410, the example meter interrogator 415, the example data receiver 505, the example data processor 510 and/or the example meter fault determiner 515 of FIGS. 2-5 may be implemented by hardware, software, firmware and/or any combination of hardware, software and/or firmware. Thus, for example, any of the example audience measurement meters 115A-C and/or 300, the example state monitors 120A-C and/or 200, the example data processing facility 135, the example presentation device state monitor 205, the example meter power manager 230, the example state logger 235, the example RTC 240, the example meter state reporter 255, the example monitoring processors 305 and/or 405, the example power controllers 310 and/or 410, the example meter interrogator 415, the example data receiver 505, the example data processor 510 and/or the example meter fault determiner 515 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example audience measurement meters 115A-C and/or 300, the example state monitors 120A-C and/or 200, the example data processing facility 135, the example presentation device state monitor 205, the example meter power manager 230, the example state logger 235, the example RTC 240, the example meter state reporter 255, the example monitoring processors 305 and/or 405, the example power controllers 310 and/or 410, the example meter interrogator 415, the example data receiver 505, the example data processor 510 and/or the example meter fault determiner 515 are hereby expressly defined to include a tangible computer readable medium such as a memory, digital versatile disk (DVD), compact disk (CD), etc., storing such software and/or firmware. Further still, the example audience measurement meters 115A-C and/or 300, the example state monitors 120A-C and/or 200, the example data processing facility 135 of FIGS. 2-5 may include one or more elements, processes and/or devices in addition to, or instead of, those illustrated in FIGS. 2-5, and/or may include more than one of any or all of the illustrated elements, processes and devices.

Flowcharts representative of example machine readable instructions that may be executed to implement one or more of the example audience measurement meters 115A-C and/or 300, the example state monitors 120A-C and/or 200, the example data processing facility 135, the example presentation device state monitor 205, the example meter power manager 230, the example state logger 235, the example RTC 240, the example meter state reporter 255, the example monitoring processors 305 and/or 405, the example power controllers 310 and/or 410, the example meter interrogator 415, the example data receiver 505, the example data processor 510 and/or the example meter fault determiner 515 are shown in FIGS. 6-11. In these examples, the machine readable instructions represented by each flowchart may comprise one or more programs for execution by a processor, such as the processor 1212 shown in the example processing system 1200 discussed below in connection with FIG. 12. Alternatively, the entire program or programs and/or portions thereof implementing one or more of the processes represented by the flowcharts of FIGS. 6-11 could be executed by a device other than the processor 1212 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-11 may be implemented manually. Further, although the example machine readable instructions are described with reference to the flowcharts illustrated in FIGS. 6-11, many other techniques for implementing the example methods and apparatus described herein may alternatively be used. For example, with reference to the flowcharts illustrated in FIGS. 6-11, the order of execution of the blocks may be changed, and/or some of the blocks described may be changed, eliminated, combined and/or subdivided into multiple blocks.

As mentioned above, the example processes of FIGS. 6-11 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-11 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 6:
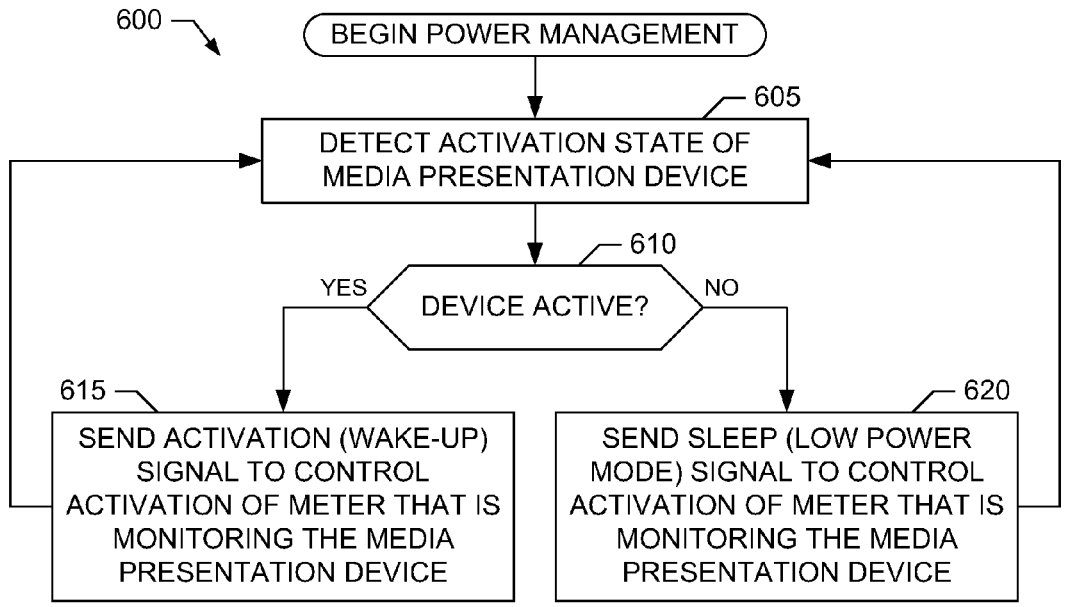
FIG. 6 is a flowchart representative of example machine readable instructions that may be executed to implement power management processing in the example state monitor of FIG. 2.

Example machine readable instructions 600 that may be executed to implement power management processing in one or more of the state monitors 120A-C and/or 200 of FIGS. 1-2 are represented by the flowchart shown in FIG. 6. For convenience, and without loss of generality, the machine readable instructions 600 are described in the context of execution by the state monitor 200 of FIG. 2 to implement the state monitor 120A of FIG. 1. As such, in this example, the state monitor 200 is performing the role of the state monitor 120A and, thus, is associated with the media presentation device 110A and the audience measurement meter 115A. With reference to the preceding figures, the machine readable instructions 600 of FIG. 6 begin execution at block 605 at which the presentation device state monitor 205 of the state monitor 200 monitors and detects an activation state of the media presentation device 110A. If the media presentation device 110A is determined to be active (block 610), then at block 615 the meter power manager 230 of the state monitor 200 controls activation of the audience measurement meter 115A by sending an appropriate activation signal (e.g., wake-up signal) to cause the audience measurement meter 115A to transition to an enabled state (e.g., state S0 of Table 1). However, if the media presentation device 110A is determined to be inactive (block 610), then at block 620 the meter power manager 230 controls activation of the audience measurement meter 115A by sending an appropriate sleep signal to cause the audience measurement meter 115A to transition to a sleep state (e.g., state S3 of Table 1). Processing then returns to block 605 to enable the presentation device state monitor 205 to continue monitoring the activation state of the media presentation device 110A.

Figure 7:
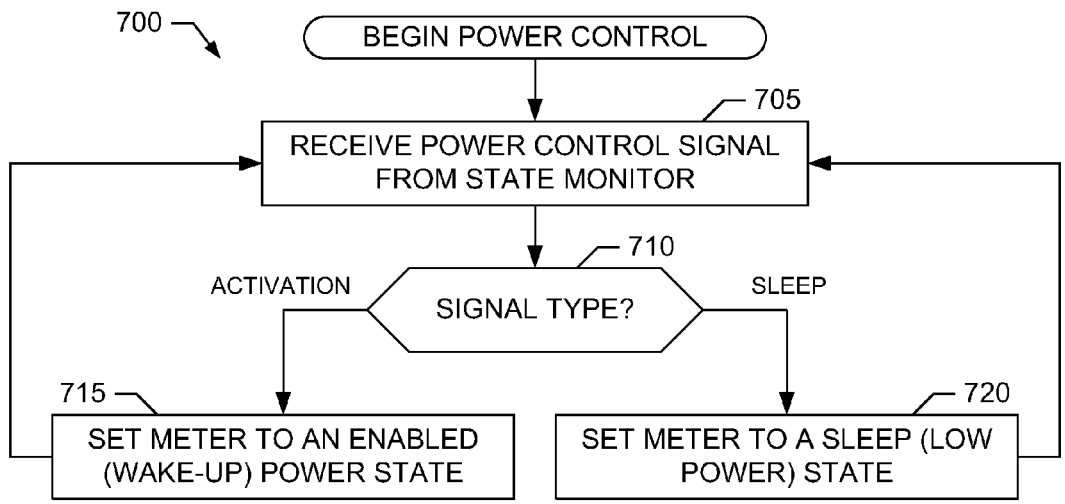
FIG. 7 is a flowchart representative of example machine readable instructions that may be executed to implement power control processing in the first example audience measurement meter of FIG. 3 and/or the second example audience measurement meter of FIG. 4.

Example machine readable instructions 700 that may be executed to implement power control processing in one or more of the audience measurement meters 115A-C and/or 300 of FIGS. 1, 3 and 4 are represented by the flowchart shown in FIG. 7. For convenience, and without loss of generality, the machine readable instructions 700 are described in the context of execution by the audience measurement meter 115A of FIGS. 1 and 4. With reference to the preceding figures, the machine readable instructions 700 of FIG. 7 begin execution at block 705 at which power controller 410 of the audience measurement meter 115A receives a power control signal from the state monitor 120A. If the power control signal corresponds to an activation (wake-up) signal (block 710), then at block 715 the power controller 410 sets the audience measurement meter 115A (e.g., by appropriate configuration of its monitoring processor 405) to an enabled state (e.g., state S0 of Table 1). If, however, the power control signal corresponds to a sleep signal (block 710), then at block 720 the power controller 410 sets the audience measurement meter 115A (e.g., by appropriate configuration of its monitoring processor 405) to a sleep state (e.g., state S3 of Table 1). Processing then returns to block 705 to enable the power controller 410 to continue performing power control for the audience measurement meter 115A.

Figure 8:
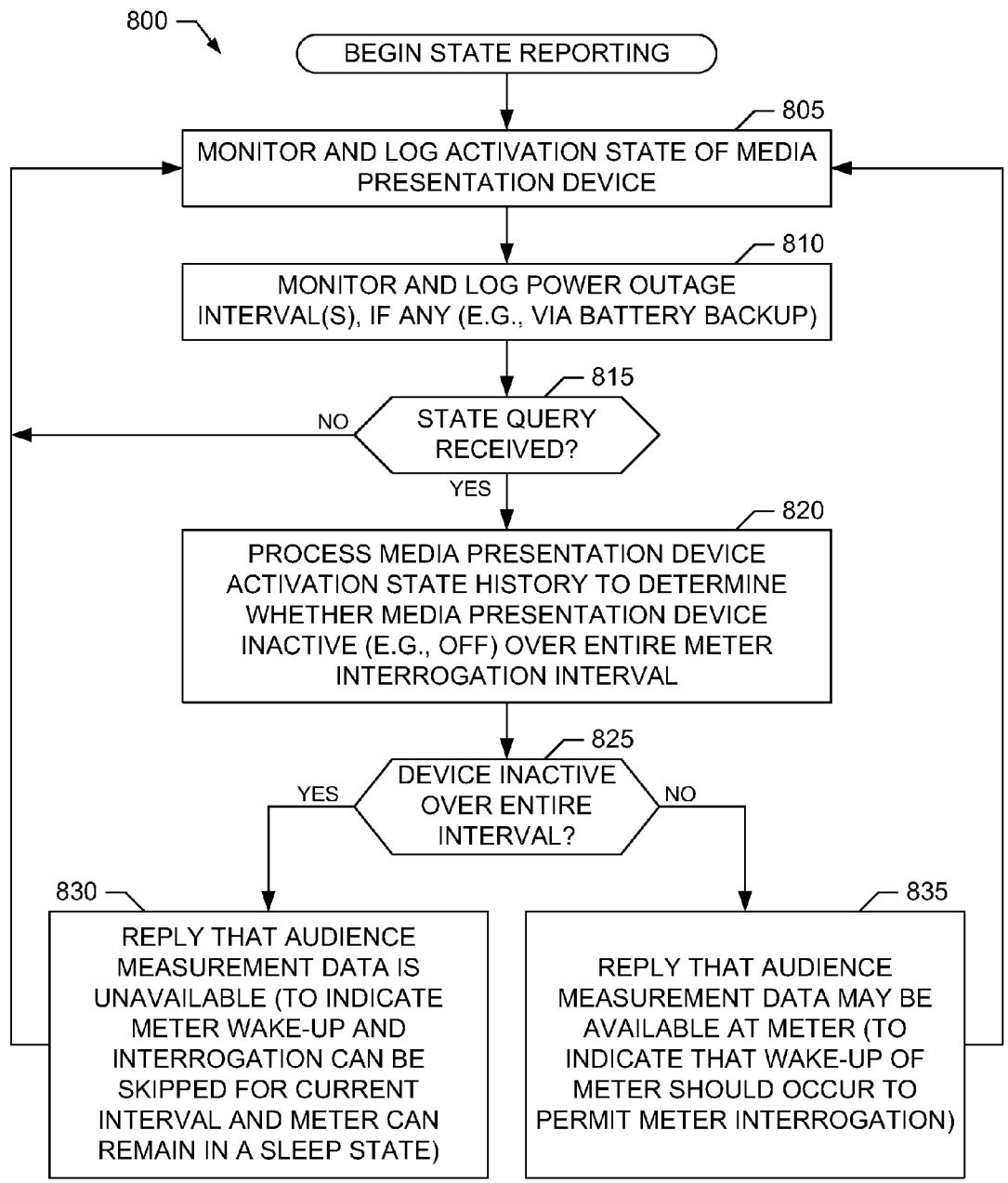
FIG. 8 is a flowchart representative of example machine readable instructions that may be executed to implement state reporting in the example state monitor of FIG. 2.

Example machine readable instructions 800 that may be executed to implement state reporting in one or more of the state monitors 120A-C and/or 200 of FIGS. 1-2 are represented by the flowchart shown in FIG. 8. For convenience, and without loss of generality, the machine readable instructions 800 are described in the context of execution by the state monitor 200 of FIG. 2 to implement the state monitor 120B of FIG. 1. As such, in this example, the state monitor 200 is performing the role of the state monitor 120B and, thus, is associated with the media presentation device 110B and the audience measurement meter 115B. With reference to the preceding figures, the machine readable instructions 800 of FIG. 8 begin execution at block 805 at which the presentation device state monitor 205 and the state logger 235 of the state monitor 200 monitor and log presentation device state data representing the activation state of the media presentation device 110B. In some examples, at block 810 the state logger 235 also logs power outage interval(s) monitored for the power source 140B powering the state monitor 200.

At block 815, the meter state reporter 255 determines whether a state query has been received from the home unit audience measurement meter 115A. If a state query has been received (block 815), at block 820 the meter state reporter 255 processes the presentation device state data logged at block 805 to determine whether the media presentation device 110B was inactive during the current interrogation/measurement interval (e.g., corresponding to a current interval of time starting from the last state query). If the media presentation device 110B was inactive during this entire interval (block 825), then at block 830 the meter state reporter 255 replies to the state query with an indication that the media presentation device 110B being monitored by the site unit audience measurement meter 115B was inactive during the entire interrogation/measurement interval and, thus, the site unit audience measurement meter 115B has no audience measurement data to report. In this case, the home unit audience measurement meter 115A can skip interrogation of the site unit audience measurement meter 115B for the current interrogation/measurement interval. However, if the media presentation device 110B was active during at least part of the interrogation/measurement interval (block 825), then at block 835 the meter state reporter 255 replies to the state query with an indication that the media presentation device 110B was active during the interrogation/measurement interval and, thus, the site unit audience measurement meter 115B may have audience measurement data to report. In this case, the home unit audience measurement meter 115A proceeds with interrogation of the site unit audience measurement meter 115B to obtain its audience measurement data for the current interrogation/measurement interval.

Figure 9:
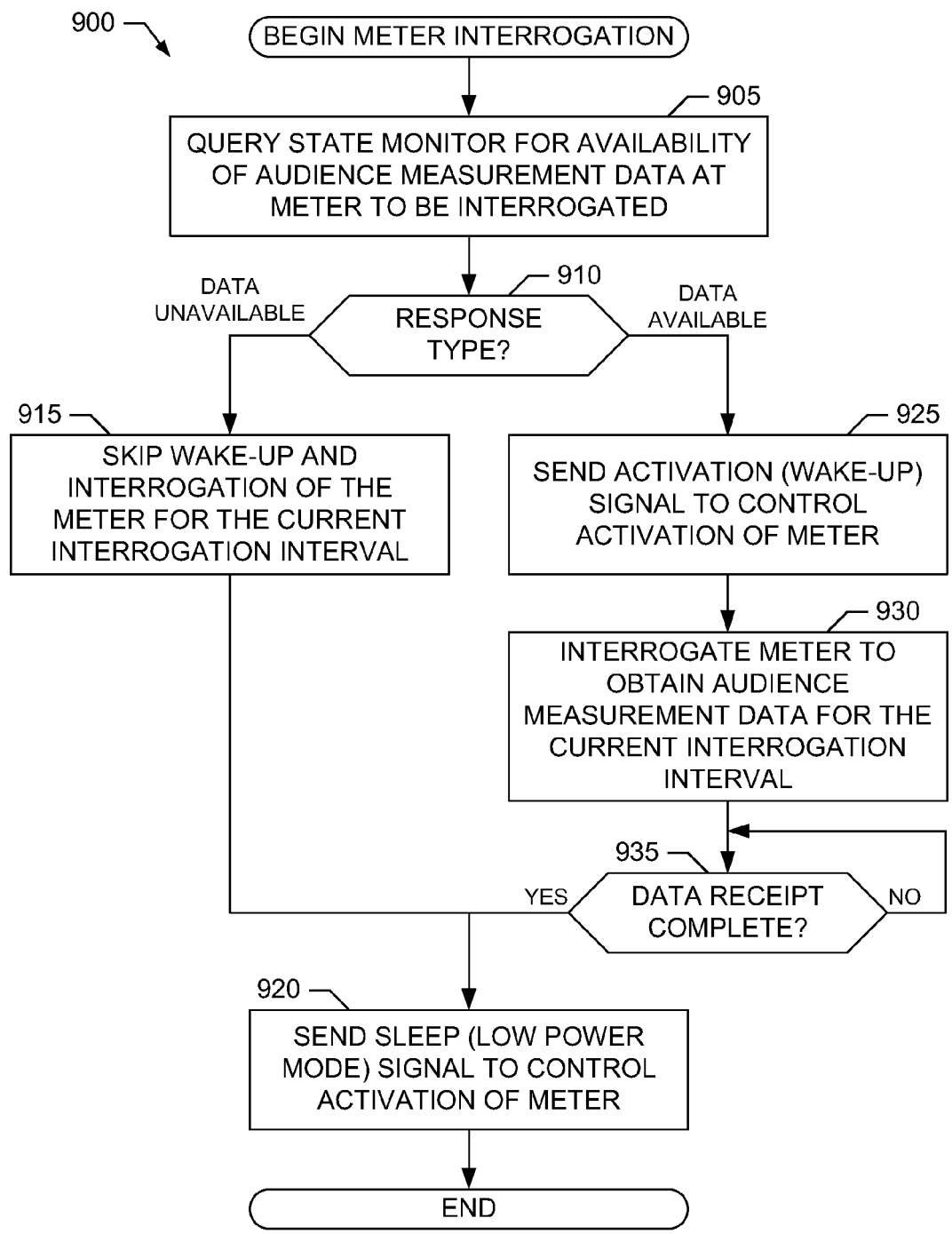
FIG. 9 is a flowchart representative of example machine readable instructions that may be executed to implement meter interrogation processing in the second example audience measurement meter of FIG. 4.

Example machine readable instructions 900 that may be executed to implement meter interrogation processing in the home unit audience measurement meter 115A of FIGS. 1 and 4 are represented by the flowchart shown in FIG. 9. For convenience, and without loss of generality, the machine readable instructions 900 are described in the context of execution by the home unit audience measurement meter 115A to interrogate the site unit audience measurement meter 115B of FIG. 1. With reference to the preceding figures, the machine readable instructions 900 of FIG. 9 begin execution at block 905 at which the meter interrogator 415 of the home unit audience measurement meter 115A queries the state monitor 120B associated with the site unit audience measurement meter 115B to determine whether the media presentation device 110B was active during the current interrogation/measurement interval and, thus, to determine whether the site unit audience measurement meter 115B has any audience measurement data to report. At block 910 the meter interrogator 415 evaluates the response received from the state monitor 120B. If the response indicates that the media presentation device 110B was inactive during the entire interrogation/measurement interval and, thus, no audience measurement data is available (block 910), then at block 915 the meter interrogator 415 skips (e.g., does not perform) waking-up and interrogation of the site unit audience measurement meter 115B. In some example, processing proceeds to block 920 at which the meter interrogator 415 further sends a sleep signal to the site unit audience measurement meter 115B to enable the meter 115B to enter a sleep state (e.g., state S3 of Table 1) if, for example, the meter 115B has not otherwise been enabled to perform other processing.

However, if the response indicates that the media presentation device 110B was active during the interrogation/measurement interval and, thus, audience measurement data may be available (block 910), then at block 925 the meter interrogator 415 sends an appropriate activation signal (e.g., wake-up signal) to cause the site unit audience measurement meter 115B to transition to an enabled state (e.g., state S0 of Table 1). At block 930, the meter interrogator 415 then queries the site unit audience measurement meter 115B to obtain any audience measurement data to be reported. After the audience measurement data is received from the site unit audience measurement meter 115B (block 935), at block 920 the meter interrogator 415 sends a sleep signal to the site unit audience measurement meter 115B to enable the meter 115B to enter a sleep state (e.g., state S3 of Table 1) if the meter 115B has not otherwise been enabled to perform other processing.

Figure 10:
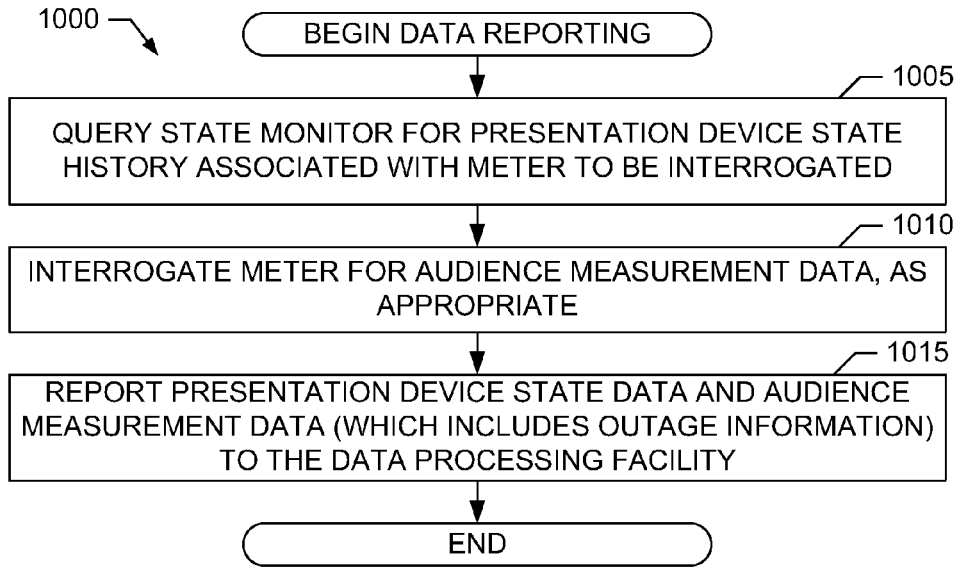
FIG. 10 is a flowchart representative of example machine readable instructions that may be executed to implement data reporting in the second example audience measurement meter of FIG. 4.

Example machine readable instructions 1000 that may be executed to implement data reporting in the home unit audience measurement meter 115A of FIGS. 1 and 4 are represented by the flowchart shown in FIG. 10. With reference to the preceding figures, the machine readable instructions 1000 of FIG. 10 begin execution at block 1005 at which the meter interrogator 415 of the home unit audience measurement meter 115A queries the state monitors 120A, 120B and 120C for presentation device state data representing the activation state history for the respective media presentation devices 110A, 110B and 110C being monitored by the respective site unit audience measurement meters 115A, 115B and 115C. At block 1010, the home unit audience measurement meter 115A interrogates the site unit audience measurement meters 115B and 115C to obtain their respective audience measurement data, as appropriate (e.g., using the example machine readable instructions 900 of FIG. 9). At block 1015, the home unit audience measurement meter 115A reports the presentation device state data obtained from the state monitors 120A-C and the audience measurement data obtained from the site unit audience measurement meters 115B-C, as well as the audience measurement data determined by the home unit audience measurement meter 115A itself, to the data processing facility 135. As noted above, the audience measurement data reported at block 1015 includes power outage and/or other outage information for the respective audience measurement meters 115A-C (e.g., in the form of gaps in the audience measurement data for the respective meters 115A-C).

Figure 11:
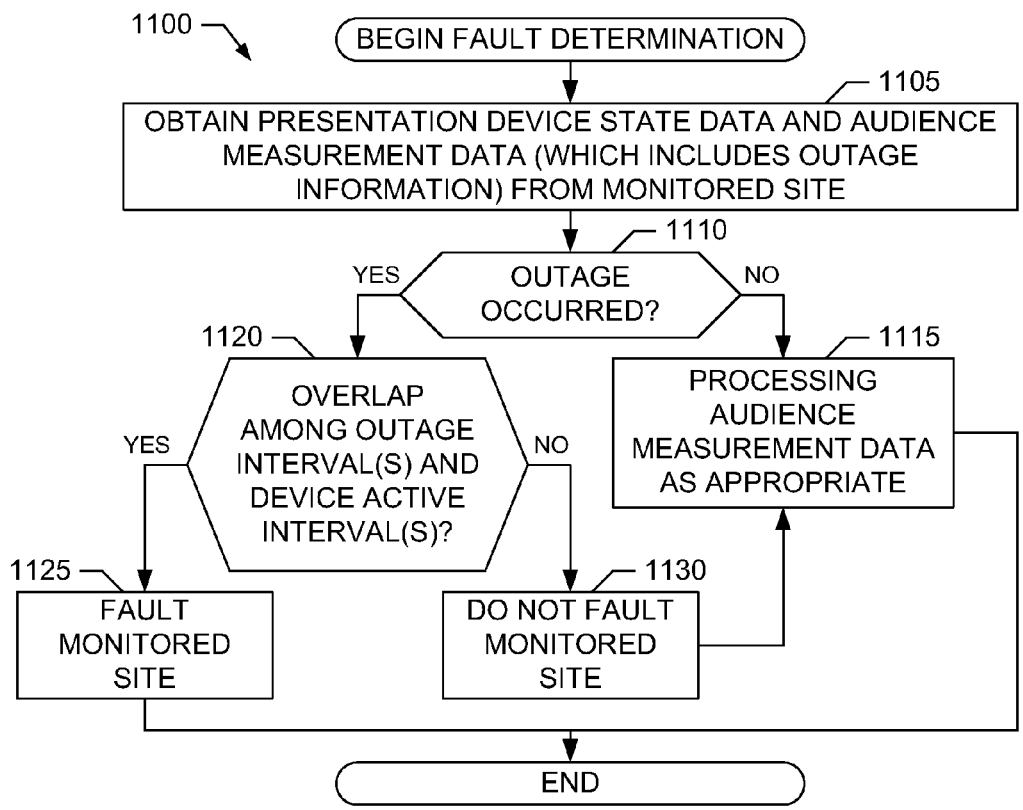
FIG. 11 is a flowchart representative of example machine readable instructions that may be executed to implement fault determination processing in the example data processing facility of FIG. 5.

Example machine readable instructions 1100 that may be executed to implement fault determination processing in the data processing facility 135 of FIGS. 1 and 5 are represented by the flowchart shown in FIG. 11. With reference to the preceding figures, the machine readable instructions 1100 of FIG. 11 begin execution at block 1105 at which the data receiver 505 of the data processing facility 135 receives respective audience measurement data obtained from the audience measurement meters 115A-C, and also respective presentation device state data obtained from the state monitors 120A-C. For convenience, and without loss of generality, the remainder of the machine readable instructions 1100 are described from the perspective of processing the audience measurement data obtained from the audience measurement meter 115A and processing the presentation device state data obtained from the state monitor 120A. As such, at block 1110 the meter fault determiner 515 of the data processing facility 135 determines whether the audience measurement data obtained from the audience measurement meter 115A indicates that the meter 115A experienced an outage (e.g., corresponding to a gap in the measurement data). If no outage occurred (block 1110), then the meter fault determiner 515 determines that the audience measurement data is valid and, at block 1115, the data processor 510 of the data processing facility 135 performs any appropriate post-processing on the audience measurement data obtained from the audience measurement meter 115A.

However, if the audience measurement data indicates that an outage occurred (block 1110), then at block 1120 the meter fault determiner 515 determines whether any outage interval determined from the audience measurement data overlaps (at least partially) with any time interval over which the presentation device state data obtained from the state monitor 120A indicates that the media presentation device 110A was active. If there is any overlap of these time intervals (block 1120), then at block 1125 the meter fault determiner 515 faults the audience measurement data obtained from the audience measurement meter 115A. If, however, there is no overlap between any outage time intervals determined from the audience measurement data and the active device time intervals determined from the presentation device state data (block 1120), then at block 1130 the meter fault determiner 515 does not fault the audience measurement data obtained from the audience measurement meter 115A. In this case, the meter fault determiner 515 determines that the audience measurement data is valid, and processing proceeds to block 1115 at which the data processor 510 performs any appropriate post-processing on the audience measurement data.

Figure 12:
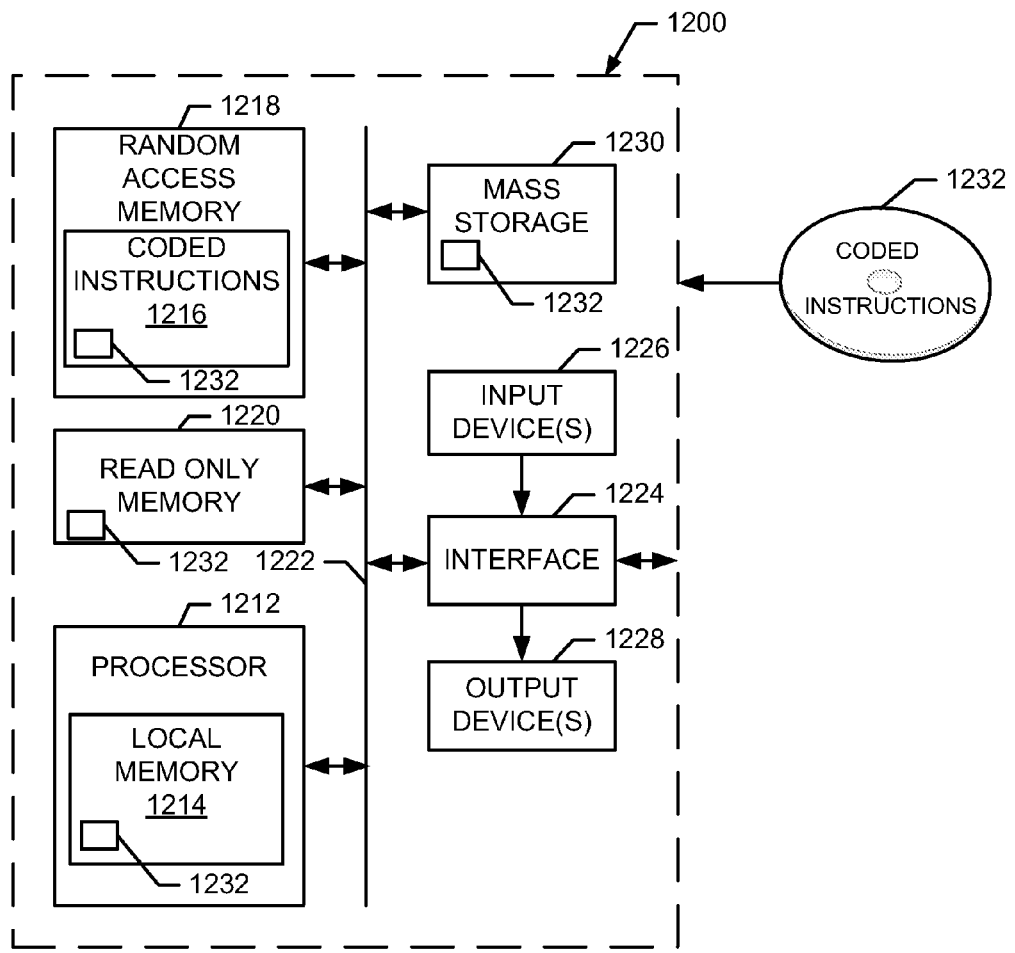
FIG. 12 is a block diagram of an example processing system that may execute the example machine readable instructions of FIGS. 6-10 and/or 11 to implement the example audience measurement system of FIG. 1, the example state monitor of FIG. 2, the first example audience measurement meter of FIG. 3, the second example audience measurement meter of FIG. 4 and/or the example data processing facility of FIG. 5.

FIG. 12 is a block diagram of an example processing system 1200 capable of implementing the apparatus and methods disclosed herein. The processing system 1200 can be, for example, a server, a personal computer, a personal digital assistant (PDA), an Internet appliance, a DVD player, a CD player, a digital video recorder, a personal video recorder, a set top box, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, the machine readable instructions represented in FIGS. 6-11. The processor 1212 may be any type of processing unit, such as one or more Intel® microprocessors from the Atom™ family, the Pentium® family, the Itanium® family and/or the XScale® family, one or more microcontrollers from the ARM® and/or PIC® families of microcontrollers, etc. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown).

The processing system 1200 also includes an interface circuit 1224. The interface circuit 1224 may be implemented by any type of interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1200 also includes one or more mass storage devices 1230 for storing machine readable instructions and data. Examples of such mass storage devices 1230 include floppy disk drives, hard drive disks, compact disk drives and digital versatile disk (DVD) drives. In some examples, the mass storage device 1230 may store the presentation device state data logged by the example state logger 235 of the example state monitor 220. Additionally or alternatively, in some examples the volatile memory 1218 may store the presentation device state data logged by the example state logger 235.

The coded instructions 1232 of FIGS. 6-11 may be stored in the mass storage device 1230, in the volatile memory 1218, in the non-volatile memory 1220, in the local memory 1214 and/or on a removable storage medium, such as a CD or DVD 1232.

As an alternative to implementing the methods and/or apparatus described herein in a system such as the processing system of FIG. 12, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   monitoring, using a processor, an activation state of a media presentation device; and
   controlling, using the processor, activation of an audience measurement meter different from the media presentation device based on the monitored activation state of the media presentation device, the audience measurement meter to monitor the media presentation device when the activation state is an active state, the controlling comprising:
   in response to determining that the media presentation device has been active during at least a portion of a time interval prior to a first time, (1) sending a wake-up signal to activate the audience measurement meter and (2) interrogating the audience measurement meter to obtain audience measurement data associated with the time interval prior to the first time; and
   in response to determining that the media presentation device has been inactive over the time interval prior to the first time, determining that interrogation of the audience measurement meter to obtain audience measurement data associated with the time interval prior to the first time is to be skipped.

2. A method as defined in claim 1 wherein monitoring the activation state of the media presentation device comprises:
   measuring power consumption of the media presentation device;
   determining that the activation state is the active state when the measured power consumption exhibits a positive slope change; and
   determining that the activation state is an inactive state when the measured power consumption exhibits a negative slope change.

3. A method as defined in claim 1 wherein monitoring the activation state of the media presentation device comprises:
   monitoring an audio output of the media presentation device;
   determining that the activation state is the active state when an audio signal is detected at the monitored audio output; and
   determining that the activation state is an inactive state when no audio signal is detected at the monitored audio output.

4. A method as defined in claim 1 wherein controlling the activation of the audience measurement meter further comprises:
   sending the wake-up signal to the audience measurement meter in response to determining that the media presentation device is in the active state; and
   sending a sleep signal to the audience measurement meter in response to determining that the media presentation device is in an inactive state.

5. A method as defined in claim 4 further comprising:
   setting the audience measurement meter to an enabled state in response to receiving the wake-up signal, the wake-up signal being communicated via at least one of a wired local area network (LAN), a wireless LAN, a universal serial bus (USB) or an input/output (I/O) pin; and
   setting the audience measurement meter to a sleep state in response to receiving the sleep signal, the sleep signal being communicated via at least one of the wired LAN, the wireless LAN, the USB or the I/O pin.

6. A method as defined in claim 1 further comprising:
   sending a sleep signal to the audience measurement meter after the audience measurement data is obtained.

7. A method comprising:
   measuring, using a processor, power consumption of a media presentation device;
   determining, using the processor, that an activation state of the media presentation device is an active state when the measured power consumption is greater than a first threshold;
   determining, using the processor, that the activation state is an inactive state when the measured power consumption is less than a second threshold different from the first threshold; and
   controlling, using the processor, activation of an audience measurement meter based on the monitored activation state of the media presentation device, the audience measurement meter to monitor the media presentation device when the activation state is the active state.

8. A tangible computer readable medium comprising machine readable instructions which, when executed, cause a machine to at least:
   monitor an activation state of a media presentation device;
   control activation of an audience measurement meter different from the media presentation device based on the monitored activation state of the media presentation device, the audience measurement meter to monitor the media presentation device when the activation state is an active state;
   in response to the media presentation device having been active during at least a portion of a time interval prior to a first time, (1) send a wake-up signal to activate the audience measurement meter and (2) interrogate the audience measurement meter to obtain audience measurement data associated with the time interval prior to the first time; and
   in response to the media presentation device having been inactive over the time interval prior to the first time, determine that interrogation of the audience measurement meter to obtain audience measurement data associated with the time interval prior to the first time is to be skipped.

9. A tangible computer readable medium as defined in claim 8 wherein to monitor the activation state of the media presentation device, the machine readable instructions, when executed, further cause the machine to:
- measure power consumption of the media presentation device;
- determine that the activation state is the active state when the measured power consumption is greater than a first threshold; and
- determine that the activation state is an inactive state when the measured power consumption is less than at least one of the first threshold or a second threshold.

10. A tangible computer readable medium as defined in claim 8 wherein to monitor the activation state of the media presentation device, the machine readable instructions, when executed, further cause the machine to:
- monitor an audio output of the media presentation device;
- determine that the activation state is the active state when an audio signal is detected at the monitored audio output; and
- determine that the activation state is an inactive state when no audio signal is detected at the monitored audio output.

11. A tangible computer readable medium as defined in claim 8 wherein to control the activation of the audience measurement meter, the machine readable instructions, when executed, further cause the machine to:
- send the wake-up signal to the audience measurement meter in response to determining that the media presentation device is in the active state; and
- send a sleep signal to the audience measurement meter in response to determining that the media presentation device is in an inactive state.

12. A tangible computer readable medium as defined in claim 11 wherein the machine readable instructions, when executed, further cause the machine to:
- set the audience measurement meter to an enabled state in response to receiving the wake-up signal, the wake-up signal being communicated via at least one of a wired local area network (LAN), a wireless LAN, a universal serial bus (USB) or an input/output (I/O) pin; and
- set the audience measurement meter to a sleep state in response to receiving the sleep signal, the sleep signal being communicated via at least one of the wired LAN, the wireless LAN, the USB or the I/O pin.

13. A tangible computer readable medium as defined in claim 8 wherein the machine readable instructions, when executed, further cause the machine to:
- determine whether the media presentation device has been inactive over the time interval prior to the first time.

14. A tangible computer readable medium as defined in claim 8 wherein the machine readable instructions, when executed, further cause the machine to:
- send a sleep signal to the audience measurement meter after the audience measurement data is obtained.

15. An apparatus comprising:
- a state monitor to monitor an activation state of a media presentation device; and
- a processor to:
  - control activation of an audience measurement meter different from the media presentation device based on the monitored activation state of the media presentation device, the audience measurement meter to monitor the media presentation device when the activation state is an active state;
  - in response to the media presentation device having been active during at least a portion of a time interval prior to a first time, (1) send a wake-up signal to activate the audience measurement meter and (2) interrogate the audience measurement meter to obtain audience measurement data associated with the time interval prior to the first time; and
  - in response to the media presentation device having been inactive over the time interval prior to the first time, determine that interrogation of the audience measurement meter to obtain audience measurement data associated with the time interval prior to the first time is to be skipped.

16. An apparatus as defined in claim 15 wherein to monitor the activation state of the media presentation device, the state monitor is to:
- measure power consumption of the media presentation device;
- determine that the activation state is the active state when the measured power consumption is greater than a first threshold; and
- determine that the activation state is an inactive state when the measured power consumption is less than at least one of the first threshold or a second threshold.

17. An apparatus as defined in claim 15 wherein to monitor the activation state of the media presentation device, the state monitor is to:
- monitor an audio output of the media presentation device;
- determine that the activation state is the active state when an audio signal is detected at the monitored audio output; and
- determine that the activation state is an inactive state when no audio signal is detected at the monitored audio output.

18. An apparatus as defined in claim 15 wherein to control activation of the audience measurement meter, the processor is to:
- send the wake-up signal to the audience measurement meter in response to determining that the media presentation device is in an active state; and
- send a sleep signal to the audience measurement meter in response to determining that the media presentation device is in an inactive state.

19. An apparatus as defined in claim 18 wherein the processor is further to:
- set the audience measurement meter to an enabled state in response to receiving the wake-up signal, the wake-up signal being communicated via at least one of a wired local area network (LAN), a wireless LAN, a universal serial bus (USB) or an input/output (I/O) pin; and
- set the audience measurement meter to a sleep state in response to receiving the sleep signal, the sleep signal being communicated via at least one of the wired LAN, the wireless LAN, the USB or the I/O pin.

20. An apparatus as defined in claim 15 wherein the processor is further to:
- determine whether the media presentation device has been inactive over the time interval prior to the first time.

21. An apparatus as defined in claim 15 wherein the processor is further to:
- send a sleep signal to the audience measurement meter after the audience measurement data is obtained.

* * * * *